(12) United States Patent
Kikukawa et al.

(10) Patent No.: US 7,929,390 B2
(45) Date of Patent: *Apr. 19, 2011

(54) OPTICAL RECORDING METHOD ON MULTILAYER OPTICAL RECORDING MEDIUM AND OPTICAL RECORDING APPARATUS

(75) Inventors: Takashi Kikukawa, Tokyo (JP); Koji Mishima, Tokyo (JP); Hidetake Itoh, Tokyo (JP)

(73) Assignee: TDK Corporation, Tokyo (JP)

( * ) Notice: Subject to any disclaimer, the term of this patent is extended or adjusted under 35 U.S.C. 154(b) by 597 days.

This patent is subject to a terminal disclaimer.

(21) Appl. No.: 12/001,588

(22) Filed: Dec. 12, 2007

(65) Prior Publication Data

US 2008/0175124 A1 Jul. 24, 2008

(30) Foreign Application Priority Data

Dec. 15, 2006 (JP) ................................. 2006-337693

(51) Int. Cl.
*G11B 7/00* (2006.01)
(52) U.S. Cl. ...................... 369/53.15; 369/53.17; 369/94
(58) Field of Classification Search .................... None
See application file for complete search history.

(56) References Cited

U.S. PATENT DOCUMENTS

| 7,489,620 | B2 | 2/2009 | Okada et al. | |
|---|---|---|---|---|
| 2003/0137909 | A1* | 7/2003 | Ito et al. | 369/47.14 |
| 2003/0137910 | A1* | 7/2003 | Ueda et al. | 369/47.14 |
| 2005/0036426 | A1* | 2/2005 | Suh | 369/94 |

FOREIGN PATENT DOCUMENTS

| JP | 2001-014808 A | 1/2001 |
|---|---|---|
| JP | 2005050543 A | 2/2005 |
| JP | 2006-500713 A | 1/2006 |
| JP | 2006244658 A | 9/2006 |
| WO | 2004019326 A1 | 3/2004 |
| WO | WO 2004/029964 A1 | 4/2004 |

* cited by examiner

*Primary Examiner* — Lixi Chow
(74) *Attorney, Agent, or Firm* — Porzio, Bromberg & Newman, P.C.

(57) ABSTRACT

When there is a defect area in a specific recording layer, recording of information is continued to restrain reduction in a recording rate. In an optical recording method for recording information on a multilayer optical recording medium having a plurality of recording layers by irradiating the recording layer with a beam spot, when a defect area is detected while the information is recorded on a specific recording layer selected from the plurality of recording layers, an escape recording layer which is selected from among the other recording layers except for the specific recording layer is irradiated with the beam spot to continue recording the information.

9 Claims, 4 Drawing Sheets

OPTICAL RECORDING METHOD ON MULTILAYER OPTICAL RECORDING MEDIUM AND OPTICAL RECORDING APPARATUS

BACKGROUND OF THE INVENTION

1. Field of the Invention

The present invention relates to an optical recording method on a multilayer optical recording medium having a plurality of recording layers, and an optical recording apparatus adopting the recording method.

2. Description of the Related Art

When information is recorded by irradiating a recording layer of an optical recording medium with a beam spot of a laser or the like, various factors can cause a recording error. Some of the factors that can cause a recording error include the meandering of a recording track on the optical recording medium, bumps and dips in the recording track, air bubbles in a spacer layer, and the like. Other factors causing a recording error may also include foreign matter such as a fingerprint, dust, and the like adhering to the surface of the optical recording medium.

In order to appropriately escape from a defect area in which any such factor exists, a recording technology has been developed which checks for a defect prior to the recording of data. For example, there is a method for detecting a defect (dropout) which utilizes the reflected light of the beam spot when recording information. Use of the reflected light of the beam spot when recording can allow for the detection of a tracking error, a focus error, and the like, so that any defect in the recording layer can be determined by the extent of these errors. When it is determined that a dropout has occurred, an optical pickup is shifted in a radial direction in order to avoid the recording track that has the defect and information is then recorded on a different recording track. Using an alternative area like this makes it possible to escape from the defect area. In order to detect the defect area, an inspection method that irradiates the recording track with a beam spot before recording is used. When information is recorded on the alternative area, being a different recording track, thereby escaping from the defect area, translation table information which refers the sector address of the defect area with the sector address of the alternative area is recorded on a defect management area provided at the innermost or outermost circumference of the optical recording medium. When the information is reproduced the next time, reference to the defect management area in order to obtain a translation table makes it possible to smoothly reproduce the information.

In recent years, a multilayer optical recording medium having a plurality of recording layers has been proposed as the preferred optical recording medium. A specific recording layer is irradiated with a beam spot by controlling the focus of a laser beam, so that information is recorded on each recording layer. Presently, if a defect area exists in each recording layer, the beam spot moves in a radial direction and records information on a different recording track in the same recording layer. A defect management area is formed at the inner or outer circumference of each recording layer. When the operation to escape from the defect area (hereinafter referred to as the escape operation) is carried out, a translation table and the like are recorded on the defect management area of that recording layer.

In this kind of multilayer optical recording medium, since the defect management area can be allocated in each recording layer, it is proposed that the translation table of the specific recording layer is concurrently recorded on the defect management area of another recording layer in order to duplicate the translation table (see Japanese Patent Application Laid-Open No. 2001-014808).

In the multilayer optical recording medium, when the defect management area is secured in the innermost or outermost circumference of each recording layer, all defect management areas are overlapped in the data stacking direction. Thus, when the innermost or outermost circumference is scratched, all the defect management areas become unavailable at the same time. In order to resolve this problem, a method for dispersively disposing the defect management areas so as not to overlap in the data stacking direction among a plurality of recording layers in a multilayer optical recording medium has been proposed (Japanese Patent Application Laid-Open No. 2006-500713).

In both Japanese Patent Application Laid-Open Nos. 2001-014808 and 2006-500713, however, in order to escape from the defect area, it is necessary to shift the optical pickup in the recording layer in the radial direction. Thus, in the case of a recording method in which the number of revolutions of a motor varies in accordance with the radial position of the optical pickup, like zone CLV, there is a problem in that control over the number of revolutions of the optical recording medium takes time and hence the recording rate is reduced during the escape operation.

The radial shift distance of the optical pickup in the escape operation is set to be sufficiently large so as to ensure escape of the defect area. As a result of this, there is a problem in that the storage capacity of the recording layer in which the defect area is detected is reduced. It is conceivable that information is separately recorded on an allowance sector between the defect area and an escape area. In such a case, however, there is a problem in that readout efficiency is reduced because the information is recorded on radially dispersive recording areas in fragments.

Furthermore, when the shift mechanism of the optical pickup used in the conventional recording method is broken and the optical pickup cannot be shifted in the radial direction, there is a problem in that it is impossible to safely end the information recording operation because the escape operation cannot be carried out.

SUMMARY OF THE INVENTION

In view of the foregoing problems, it is an object of the present invention that when a defect area occurs in a recording layer of a multilayer optical recording medium, an escape operation is safely and quickly carried out in order to restrain any reduction in a recording rate.

The foregoing object is achieved by the following means which the inventors have determined by diligent study.

A first aspect of the present invention is an optical recording method for recording information on a multilayer optical recording medium having a plurality of recording layers by irradiating the recording layer with a beam spot, wherein the information is recorded on a specific recording layer selected from the plurality of recording layers and when a defect area is detected during recording on the specific recording layer, an escape recording layer selected from among the other recording layers except for the specific recording layer is irradiated with the beam spot in order to continue recording the information.

In this optical recording method according to the first aspect of the present invention, wherein the multilayer optical recording medium has three or more recording layers and a recording layer which is two- or more-layers away from the specific recording layer is selected as the escape recording layer.

In this optical recording method according to the first aspect of the present invention, wherein the multilayer optical recording medium has three or more recording layers and a recording layer which is even-numbered layers away from the specific recording layer is selected as the escape recording layer.

In this optical recording method according to the first aspect of the present invention, wherein the multilayer optical recording medium has four or more recording layers.

In this optical recording method according to the first aspect of the present invention, wherein after a predetermined amount of information is recorded on the escape recording layer, the beam spot returns to the specific recording layer to escape from the defect area and continue recording the information.

A second aspect of the present invention is an optical recording apparatus for recording information on a multilayer optical recording medium having a plurality of recording layers, the optical recording apparatus irradiating the multilayer optical recording medium with a beam spot in order to record information, the apparatus comprising: a recording section for recording the information by irradiating a specific recording layer of any of the recording layers with the beam spot; an inspection processing section for detecting a defect area with the use of reflected light of the beam spot of the recording section; and a focus shift processing section for shifting the focus of the beam spot to a recording layer which is different from the specific recording layer when the defect area is detected by an inspection process.

According to the information recording method and the like of the present invention, when a defect area is detected in a recording layer of a multilayer optical recording medium, an escape operation can be carried out quickly and hence it is possible to restrain any reduction in the recording rate.

BRIEF DESCRIPTION OF THE DRAWINGS

The above and other objects, features and advantages of the present invention will become apparent from the following description and appended claims, taken in conjunction with the accompanying drawings.

DETAILED DESCRIPTION OF THE PREFERRED EMBODIMENTS

Embodiments of the present invention will be described in detail with reference to the accompanying drawings.

Figure 1:
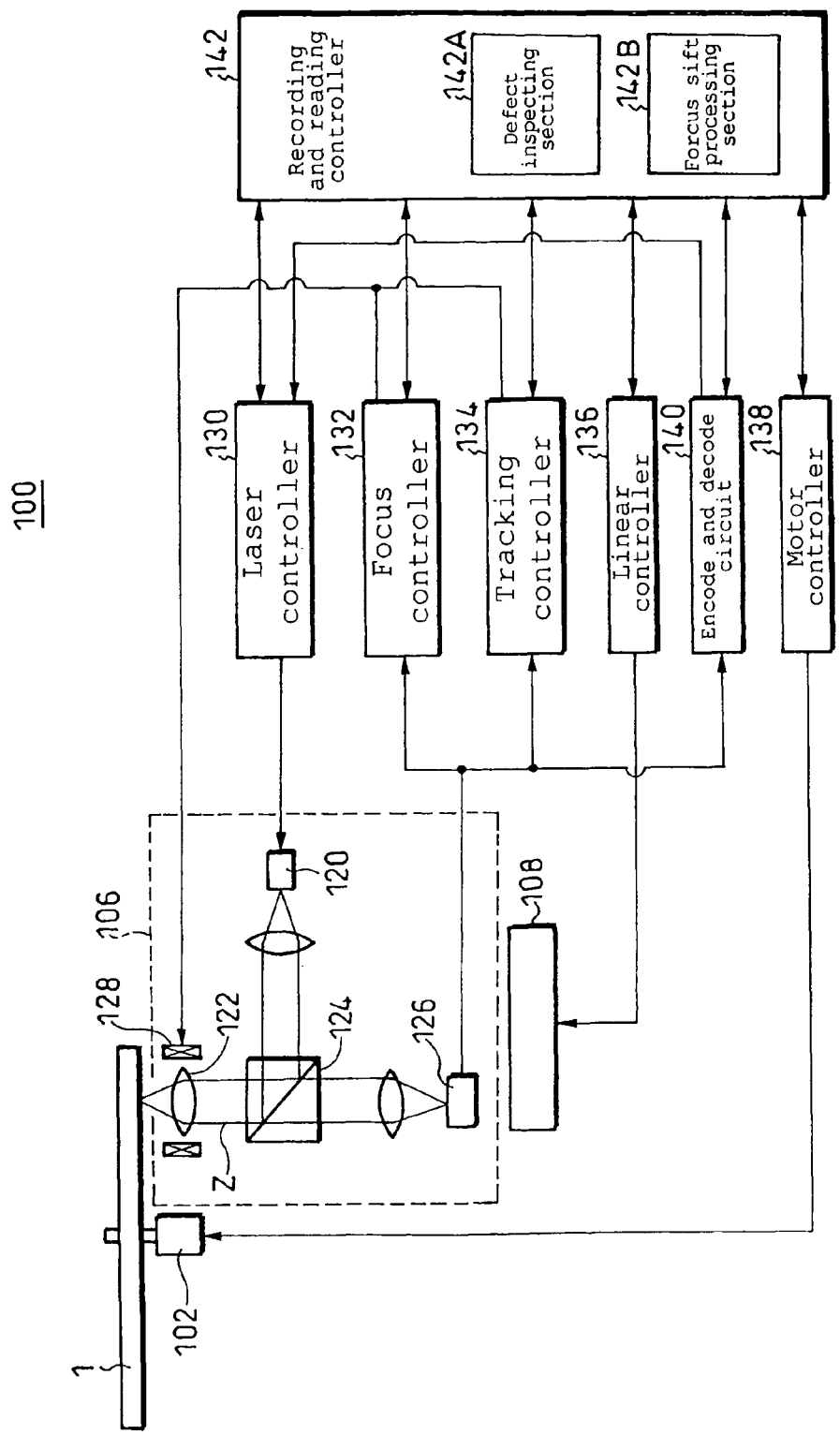
FIG. 1 is a block diagram showing an example of the structure of a recording and reproducing apparatus according to embodiments of the present invention.

FIG. 1 shows a recording and reproducing apparatus 100 which performs an optical recording method according to various embodiments of the present invention. The recording and reproducing apparatus 100 is provided with a motor 102, an optical pickup 106, and a linear drive mechanism 108. The motor 102 rotates an optical recording medium 1. The optical pickup 106 irradiates the optical recording medium 1 with a beam spot to record and reproduce information. The linear drive mechanism 108 linearly drives the optical pickup 106 in a radial direction of the optical recording medium 1. The optical recording medium 1 is a multilayer optical recording medium which has a plurality of recording layers for recording information on.

The optical pickup 106 is provided with a laser light source 120, an objective lens 122, a half mirror 124, a photo-detection device 126, and a lens drive coil 128. The optical pickup 106 can adjust the focus of the laser light Z on the recording layer of the optical recording medium 1.

The laser light source 120 is a semiconductor laser which generates the laser light Z for both recording and reading. The objective lens 122 forms the minute beam spot by narrowing the focus of the laser light Z and irradiates the specific recording layer with it. The half mirror 124 takes out reflected light from the recording layer and directs it to the photo-detection device 126. The photo-detection device 126, being a photo-detector, receives the reflected light of the laser light Z and converts it into an electrical signal. The lens drive coil 128 shifts the objective lens 122 to the direction of the optical axis and to a tracking direction.

Furthermore, the recording and reproducing apparatus 100 is provided with a laser controller 130, a focus controller 132, a tracking controller 134, a linear controller 136, a motor controller 138, a encode and decode circuit 140, and a recording and reading controller 142. The laser controller 130 controls the driving of the laser light source 120 of the optical pickup 106 on the basis of directions received from the encode and decode circuit 140 and the recording and reading controller 142. The focus controller 132 detects a focus error based on the electrical signal sent from the photo-detection device 126 and controls the drive of the lens drive coil 128 in a focus direction (being the direction of the optical axis) with the use of the focus error. The focus controller 132 also has the function of transmitting focus error information to the recording and reading controller 142. The tracking controller 134 detects a tracking error on the basis of the electrical signal sent from the photo-detection device 126 and controls the drive of the lens drive coil 128 in the tracking direction with the use of the tracking error. The tracking controller 134 also has the function of transmitting tracking error information to the recording and reading controller 142 and to the linear controller 136. Accordingly, it is possible to make the beam spot follow a recording track using the tracking control of the lens drive coil 128 and the linear drive of the whole optical pickup 106 using the linear controller 136. The linear controller 136 controls the drive of the linear drive mechanism 108 which is composed of a linear motor and the like, and slides the optical pickup 106 in the radial direction of the optical recording medium 1. The motor controller 138 controlling the rotational speed of the motor 102 rotates the optical recording medium 1 using the zone CLV method in this instance. A CLV method is a recording method by which the optical pickup 106 moves with constant linear velocity on the optical recording medium 1, in other words, the number of revolutions per minute is gradually reduced from the inner circumference to the outer circumference of the optical recording medium 1. In addition to this, the zone CLV divides the recording layer of the optical recording medium 1 into several areas (zones) from the inner circumference outwards and information is recorded by the CLV method on a zone-by-zone basis.

The encode and decode circuit 140 has a encode function and a decode function. As the decode function, the encode and decode circuit 140 decodes the electrical signal sent from the photo-detection device 126 into a digital signal and transmits the digital signal to the recording and reading controller 142. As the encode function, the encode and decode circuit 140 subjects a digital signal for recording sent from the recording and reading controller 142 to a pulse modulation and transmits an electrical signal after modulation to the laser controller 130. The recording and reading controller 142 for integrally controlling the entire control device controls various kinds of controllers, drivers, and the like by using a CPU and a buffer memory, which are not especially illustrated, and also carries out the input and output of recording and reading information to a host computer. To be more specific, the recording and reading controller 142 is provided with a defect inspection processing section 142A and a focus shift processing section 142B. The defect inspection processing section 142A detects a defect area (dropout area) of the optical recording medium 1 by use of a focus error signal and a tracking error signal detected by the focus controller 132 and the tracking controller 134. The focus shift processing section 142B gives a focus shift command to the focus controller 132 when the defect inspection processing section 142A detects the defect area, so that the focus of the beam spot is shifted to a recording layer different from this recording layer to continue recording.

In the recording and reproducing apparatus 100, the wavelength of the laser light Z is set to a value in the range of 400 to 410 nm and the initial reproducing power of the laser light Z is set to a value in the range of 0.3 to 2.0 mW. The numerical aperture NA of the objective lens 122 in the optical pickup 106 is set to a value in the range of 0.70 to 0.90. Accordingly, the spot diameter (λ/NA) of the laser light Z is set to a value in the range of 444 nm to 586 nm.

In order to record information on the optical recording medium 1, the laser light Z is generated from the laser light source 120 by the recording power and the specific recording layer of the optical recording medium 1 is irradiated with the beam spot. In order to reproduce the information, on the other hand, the laser light Z is generated from the laser light source 120 by the reading power and the recording layer of the optical recording medium 1 is irradiated with the laser light Z. In the case of both recording and reading, the laser light Z which is reflected from the recording layer and is taken out through the optical pickup 106 becomes an electrical signal in the photo-detection device 126. The electrical signal becomes a digital signal by passing through the encode and decode circuit 140.

Figure 2A:
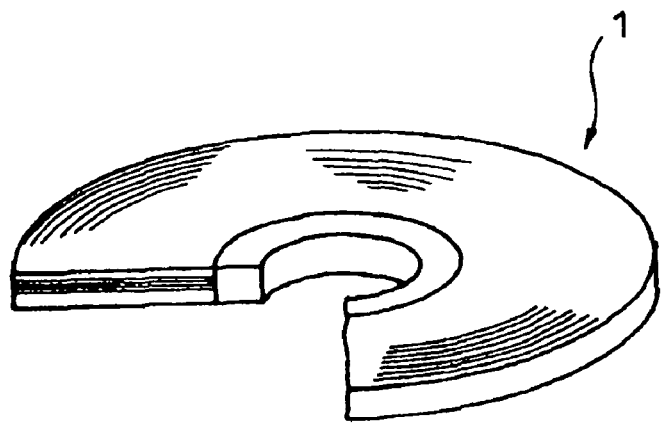
FIG. 2A is a perspective view and FIG. 2B is an enlarged sectional view showing an optical recording medium used in the embodiments of the present invention.
Figure 2B:
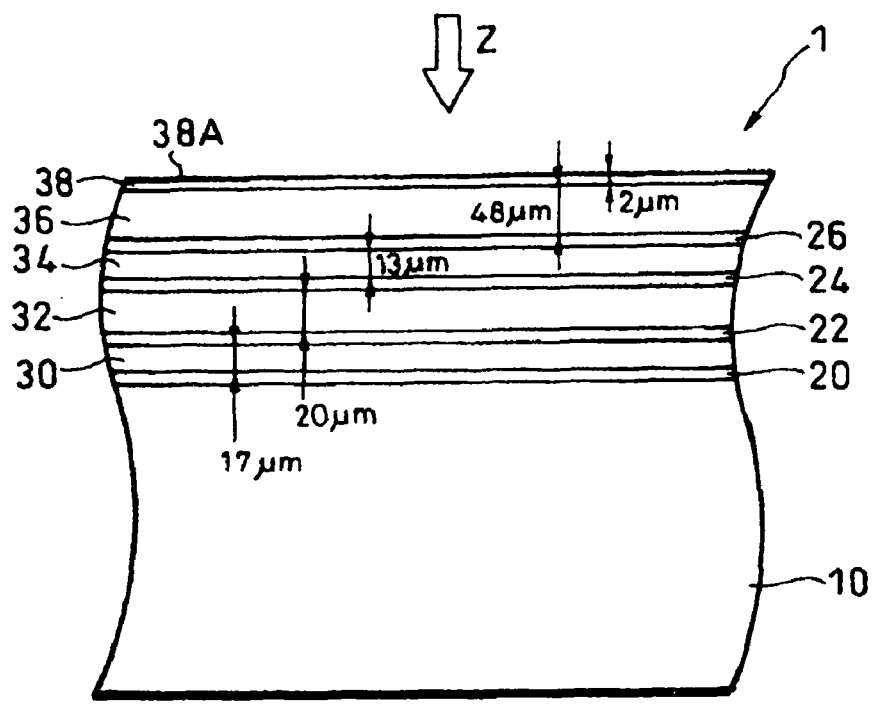

The optical recording medium 1 used for the reproduction of the recording and reproducing apparatus 100 will now be described. First, with reference to FIG. 2A, the optical recording medium 1 is a disc shaped with a diameter of approximately 120 mm and a thickness of approximately 1.2 mm. As shown in FIG. 2B by enlargement, the optical recording medium 1, being the multilayer medium with four recording layers, is composed of a substrate 10, an L0 recording layer 20, a first spacer layer 30, an L1 recording layer 22, a second spacer layer 32, an L2 recording layer 24, a third spacer layer 34, an L3 recording layer 26, a cover layer 36, and a hard coat layer 38 which are deposited in this order.

All of the first to third spacer layers 30, 32, and 34, the cover layer 36, and the hard coat layer 38 have optical transparency and incident laser light from the outside passes therethrough. As a result, using the laser light Z incident from a light incident surface 38A of the hard coat layer 38 makes it possible to record and reproduce information on and from all of the L0 to L3 recording layers 20, 22, 24, and 26.

The L0 recording layer 20 is the farthest away from the light incident surface 38A and the L3 recording layer 26 is the nearest to the light incident surface 38A. When information is recorded/reproduced on/from the L0 recording layer 20, the L0 recording layer 20 is irradiated with the laser light Z through the L1 to L3 recording layers 22, 24, and 26. In a similar manner, when information is recorded/reproduced on/from the L1 recording layer 22, the L1 recording layer 22 is irradiated with the laser light Z through the L2 and L3 recording layers 24 and 26. When information is recorded/reproduced on/from the L2 recording layer 24, the L2 recording layer 24 is irradiated with the laser light Z through the L3 recording layer 26. When information is recorded/reproduced on/from the L3 recording layer 26, the L3 recording layer 26 is directly irradiated with the laser light Z without passing through the other recording layers. In the optical recording medium 1, the storage capacity of each of the L0 to L3 recording layers 20, 22, 24, and 26 is set at 25 GB and therefore a storage capacity of 100 GB in total is secured.

The substrate 10 is a disc-shaped member with a thickness of approximately 1.1 mm. The material of the substrate 10 may be made of various materials such as, for example, glass, ceramic, and resin. A polycarbonate resin is used in this instance. The resin may also be an olefin resin, an acrylic resin, an epoxy resin, a polystyrene resin, a polyethylene resin, a polypropylene resin, a silicon resin, a fluorine resin, an ABS resin, an urethane resin, or the like in addition to the polycarbonate resin. Of the resins described above, the polycarbonate resin and the olefin resin are preferable due to the fact that they are easily processed and molded. In the surface of the substrate 10 on the side on which the recording layer is located, a groove, a land, a pit train, and the like are formed in accordance with the desired application of the optical recording medium.

The first to third spacer layers 30, 32, and 34 which are deposited between the L0 to L3 recording layers 20, 22, 24, and 26 have the function of separating each of the recording layers 20, 22, 24, and 26. A groove (land), a pit row, and the like are formed in the surface of each of the spacer layers 30, 32, and 34 on the light incident surface 38A side. Various materials are available to form the first to third spacer layers 30, 32, and 34 but, as described above, it is necessary to use a material with optical transparency in order to allow the laser light Z to pass therethrough. It is also preferable to use, for example, an UV-curable acrylic resin.

In the optical recording medium 1, the thickness of the first spacer layer 30 is set at 17 μm, the thickness of the second spacer layer 32 is set at 20 μm, and the thickness of the third spacer layer 34 is set at 13 μm. Varying the thicknesses of the spacer layers 30, 32, and 34 from one another, as described above, makes it possible to reduce the interference of a reading signal and hence reduce noise in a readout signal. The thickness of the hard coat layer 38 is set at 2 μm and the thickness of the cover layer 36 is set at 48 μm.

Accordingly, in the optical recording medium 1, the distance from the light incident surface 38A to the L3 recording layer 26 is approximately 50 μm, the distance from the light incident surface 38A to the L2 recording layer 24 is approximately 63 μm, the distance from the light incident surface 38A to the L1 recording layer 22 is approximately 83 μm, and the distance from the light incident surface 38A to the L0 recording layer 20 is approximately 100 μm. The L0 recording layer 20, including its storage capacity (25 GB), is compliant with the Blu-ray Disc standard.

These L0 to L3 recording layers 20, 22, 24, and 26 can hold data. The data holding form is the so-called recording type in which writing by a user is possible. The recording type, to be more specific, is divided into a write-once read-many type in which, if data has been written once in an area, new data is not rewritable in that area and a rewritable type in which, even if data has been written in an area, the data is erased and new data is rewritable. The data holding form of the L0 to L3 recoding layers 20, 22, 24, and 26 can be of either type. It should be noted, however, that the data holding forms of the recording layers 20, 22, 24, and 26 may also be different from one another.

Figure 3:
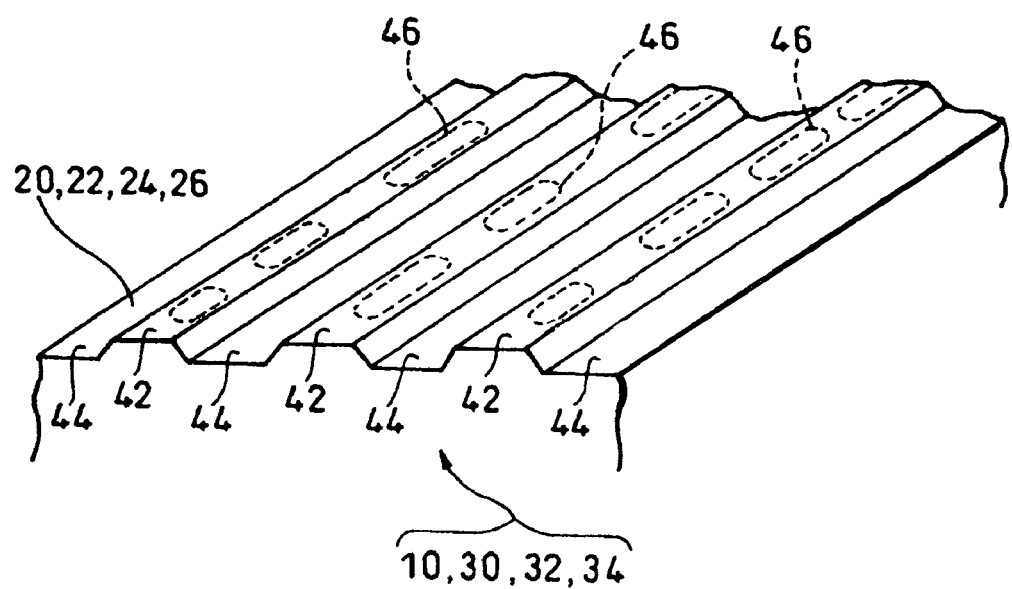
FIG. 3 is an enlarged perspective view showing a data holding form in a recording layer of the optical recording medium.

As shown in FIG. 3, a spiral groove 42 (land 44) formed in the surfaces of the substrate 10 and the first to third spacer layers 30, 32, and 34 becomes a recording track for each of the recording layers 20, 22, 24, and 26. The spiral direction of the groove 42 is the same in the L0 recording layer 20 and the L2 recording layer 24, and the spiral direction of the groove 42 of the L1 recording layer 22 and the L3 recording layer 26 is opposite to that of the L0 recording layer 20 and the L2 recording layer 24. In other words, in the L0 to L3 recording layers 20, 22, 24, and 26, the spiral direction is set to differ from that of the adjacent recording layer. As a result, the final sector of the L0 recording layer 20 and the first sector of the L1 recording layer 22, being adjacent to the L0 recording layer 20, can be disposed in common on one of the innermost and outermost circumferences. Accordingly, even when information is continuously recorded/reproduced on/from the L0 recording layer 20 and the L1 recording layer 22, it becomes unnecessary to shift the optical pickup 106 in the radial direction and recording and reading are continuously carried out. A recording film is formed in the L0 to L3 recording layers 20, 22, 24, and 26 and a recording mark 46 can be formed therein by the energy of the laser light Z. The groove 42 acts as a guide track for the laser light Z during recording data. By modulating the intensity of the energy of the laser light Z proceeding along the groove 42, the recording marks 46 are formed in the recording layers 20, 22, 24, and 26 on the groove 42. In the case of the write-once read-many type of data holding form, the recording marks 46 are irreversibly formed and cannot be erased. In the case of the rewritable type of data holding form, on the other hand, the recording marks 46 are reversibly formed and can be erased and formed again. The recording film also has to have both optical transparency and light reflectivity. The recording marks 46 are formed on the groove 42 in this instance, but may be formed on the land 44. Otherwise, the recording marks 46 may be formed on both the groove 42 and the land 44.

When there is a plurality of recording layers 20, 22, 24, and 26, as described above, it is necessary to increase the optical transparency of the recording layers 22, 24, and 26 in order to make the laser light Z, provided it has sufficient intensity, reach the L0 recording layer 20 which is the farthest away from the light incident surface 38A. For example, it is preferable to set the optical transparency of the L3 recording layer 26 which is the nearest to the light incident surface 38A at approximately 80.

A method for recording information on the optical recording medium 1 by the recording and reproducing apparatus 100 will now be described.

When recording information is inputted from the host computer to the recording and reading controller 142, the laser controller 130, the focus controller 132, the tracking controller 134, the linear controller 136, the motor controller 138, and the like are controlled in order to start recording. As a result of this, the optical recording medium 1 rotates and the optical pickup 106 is set in a predetermined position so that preparation for recording is completed. The L0 recording layer 20 is first selected as a specific recording layer on which recording is carried out in this instance, and the optical pickup 106 is positioned in a target recording track at which recording is started in the L0 recording layer 20.

Figure 4A:
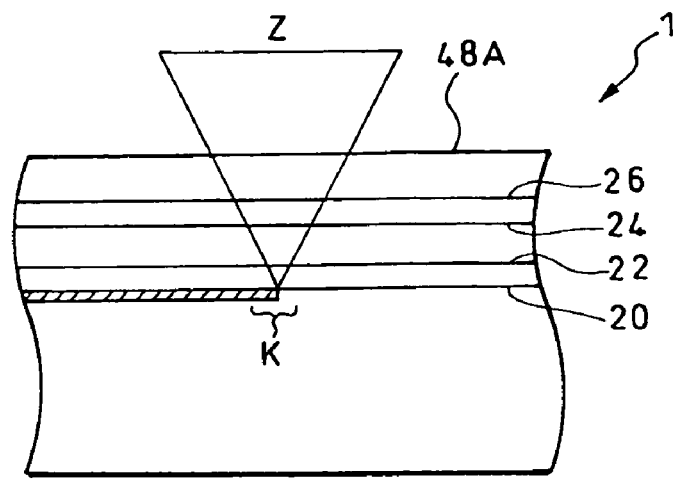
FIGS. 4A to 4C are sectional views showing the information recording states of each recording layer of the optical recording medium.

The encode and decode circuit 140 encodes the recording information into a pulse signal and inputs it to the laser controller 130. As a result of this, the laser light source 120 set at a particular recording power emits the predetermined laser light Z by pulse irradiation and, as shown in FIG. 4A, its beam spot is incident upon the L0 recording layer 20 in order to record the information. Since the groove 42 is spirally formed in the L0 recording layer 20 in such a manner as to run out from the inside to the outside in the radial direction, the optical pickup 106 shifts to the outside in the radial direction with the progress of the recording.

During the recording operation, the reflected light of the laser light Z is converted into an electrical signal by the photo-detection device 126 through the half mirror 124. With reference to the electrical signal, the focus controller 132, the tracking controller 134, and the linear controller 136 control the optical pickup 106 and the linear drive mechanism 108 whenever necessary. For example, the focus controller 132 detects the focus error. When the focus of the beam spot deviates from the L0 recording layer 20, the focus controller 132 controls the lens drive coil 128 so that the objective lens 122 is shifted in the direction of the optical axis in order to achieve focus. The tracking controller 134 detects the tracking error, that is, whether or not the beam spot correctly follows the groove 42. When the beam spot deviates from the groove 42, the tracking controller 134 shifts the lens drive coil 128 and also shifts the entire optical pickup 106 via the linear controller 136 to make the beam spot follow the groove 42. Therefore, it becomes possible to correctly record the information on the groove 42.

Figure 4B:
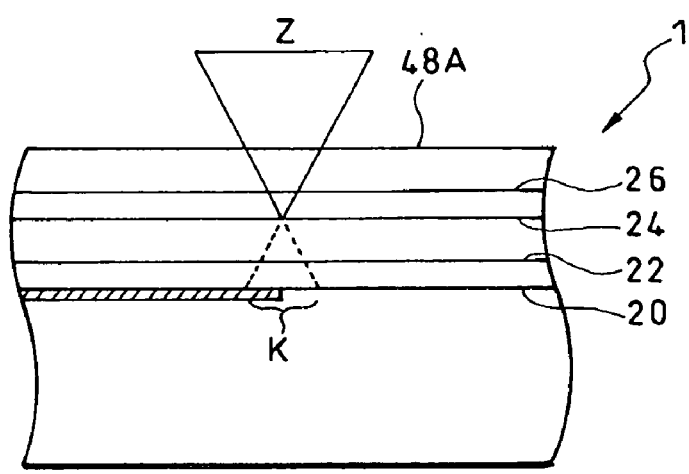

The defect inspection processing section 142A of the recording and reading controller 142 judges whether or not the recording track of the L0 recording layer 20 includes a defect area on the basis of information such as the foregoing focus error and tracking error. In this instance, when the focus error or the tracking error exceeds a predetermined permitted value or the accumulation of the errors exceeds a predetermined permitted amount, the defect inspection processing section 142A judges the recording track or the sector to be a defect area K. When the defect inspection processing section 142A detects the defect area K, the focus shift processing section 142B selects an escape recording layer on which information is recorded instead of on the L0 recording layer 20. Another recording layer except for the L0 recording layer 20 is selected as the escape recording layer. The L2 recording layer 24 which is two-layers away from the L0 recording layer 20 is selected in this instance. Thus, the focus controller 132 drives the lens drive coil 128 so as to shift the objective lens 122 in the direction of the optical axis and, as shown in FIG. 4B, the L2 recording layer 24 is irradiated with the beam spot. At this time, since the tracking control is carried out as infrequently as possible, information which has been recorded on the defect area K is recorded again on the recording track in approximately the same position as the defect area K of the L0 recording layer 20 in a stacking direction. As described above, the spiral direction of the recording track of the L0 recording layer 20 coincides with that of the L2 recording layer 24 in the optical recording medium 1. Thus, a predetermined amount of information is recorded on the L2 recording layer 24, the optical pickup 106 gradually shifts further to the outside in the radial direction.

Figure 4C:
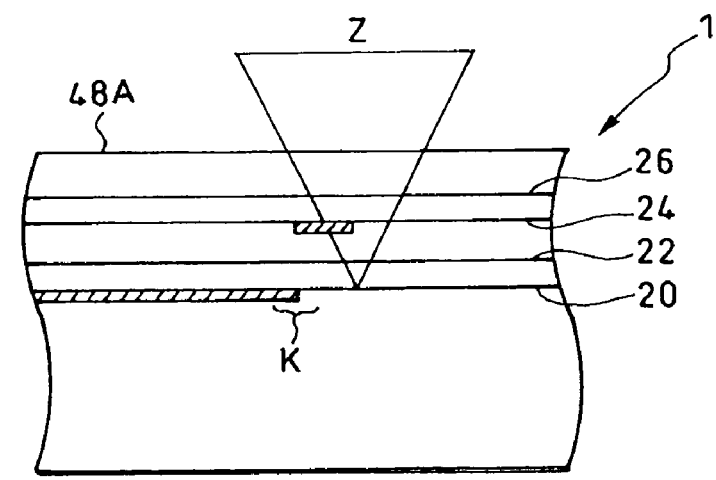

After that, when it is determined that a shift of the optical pickup 106 to the outside in the radial direction by the recording operation on the L2 recording layer 24, being the escape recording layer, is enough to escape from the defect area K of the L0 recording layer 20, being the specific recording layer in the radial direction, as shown in FIG. 4C, the focus shift processing section 142B of the recording and reading controller 142 shifts the focus of the beam spot to the L0 recording layer 20 again to restart recording on the L0 recording layer 20. At this time, since the tracking control is carried out as infrequently as possible, the information is continuously recorded on the recording track in approximately the same position as the recording area of the L2 recording layer 24 in the stacking direction. Since the defect area K of the L0 recording layer 20 exists in a different position due to the recording operation on the L2 recording layer 24, it is possible to safely record the information even on the L0 recording layer 20.

According to the recording and reproducing apparatus 100 of the present embodiment, when a defect area is located during the recording operation on a specific recording layer, the recording of information can be continued by quickly moving to another recording layer. Thus, when compared with the case of shifting the optical pickup 106 in the radial direction in a specific recording layer by tracking control, it becomes possible to quickly complete an escape operation and hence restrain any reduction in the recording rate. Particularly in the case of the zone CLV method and the like, it is necessary to vary the rotational speed of the optical recording medium 1 when the optical pickup 106 is shifted in the radial direction, and it takes time to make the rotational speed converge to a target rotational speed. Escape in the stacking direction, as described above, makes it possible to move from the defect area while keeping the rotational speed of the optical recording medium 1 constant. Even if the optical pickup 106 cannot be shifted in the radial direction due to failure of the linear drive mechanism 108, the escape operation using the focus control can safely complete the information recording operation.

As a result of realizing such a quick escape operation, it becomes possible to reduce the amount of recording on the escape recording layer and quickly return to the specific recording layer. This is because even if the return area is a defect area, it is only necessary to shift to the escape recording layer and continue recording. As a result of this, it is possible to increase the storage capacity of the recording layer.

When a defect area is detected in the L0 recording layer 20, there is an increased possibility that a defect may occur in the L0 recording layer 20 itself and in the adjacent substrate 10 or in the first spacer layer 30. The defect in the vicinity of the recording layer, being the recording target, causes a problem in forming the beam spot and tends to have an effect on both recording and reading. Some of the factors that can cause a defect include the meandering of a groove 42, bumps and dips in the groove 42, air bubbles in the first spacer layer 30 and the substrate 10, and the like. The recording and reproducing apparatus 100 selects the L2 recording layer 24 which is two- or more-layers away from the specific recording layer (L0 recording layer 20) in which the defect area is detected as the escape recording layer. Thus, if there is a factor causing a defect in the vicinity of the L0 recording layer 20, the factor has little effect on the beam spot applied to the escape recording layer which is two- or more-layers away, so that it becomes possible to safely continue recording.

Of the escape recording layers which are two- or more-layers away, the L2 recording layer 24 which is even-numbered layers away, is specifically selected in the present embodiment. Taking a case where the optical recording medium 1 has a five-layer structure with L0 to L4 recording layers as an example, the L2 recording layer or the L4 recording layer is selected when escaping form the L0 recording layer 20. Thus, as described above, the spiral direction of the recording track of the specific recording layer coincides with that of the escape recording layer. As a result of this, the recording operation on the escape recording layer can double the escape operation of the defect area in the specific recording layer, so that it becomes possible to enable an early return to the specific recording layer using the focus control.

The present embodiment considered a case where the L0 recording layer 0 was set as the specific recording layer, but, for example, when the L1 recording layer 22 is set as the specific recording layer, it is preferable to select the L3 recording layer 26 as the escape recording layer. This is because the L3 recording layer 26 is both even-numbered layers away and two- or more-layers away from the L1 recording layer 22. In a similar manner, when the L2 recording layer 24 is the specific recording layer, it is preferable to select the L0 recording layer 20 as the escape recording layer. When the L3 recording layer 26 is the specific recording layer, it is preferable to select the L1 recording layer 22 as the escape recording layer. In the case of the multilayer optical recording medium 1 having the four or more layers, as described above, it is possible to select the escape recording layer which is two or more-layers away with respect to every recording layer.

Although it is not illustrated herein, in the case of a three-layer optical recording medium having L0, L1, and L2 recording layers, when information is recorded on the middle L1 recording layer, there is not a recording layer which is two- or more-layers away therefrom so that either the adjacent L0 or L2 recording layer is selected as the escape recording layer. When recording is continued by moving to the escape recording layer, it is conceivable that a defect area may be detected soon in the escape recording layer. In this case, since the defect area detected in the specific recording layer may be relatively large, it is determined that this defect affects the escape recording layer and hence the optical pickup 106 is shifted in the radial direction using the tracking control. By appropriately combining escape operation in the stacking direction with the escape operation in the radial direction like this, optimal recording control can be realized.

In the present embodiment as described above, after a predetermined amount of information is recorded on the escape recording layer, the beam spot is returned to the specific recording layer, however, the present invention is not limited thereto. For example, it is possible to continue recording on the escape recording layer. In this case, the escape recording layer becomes a new specific recording layer in the present invention, and when a defect is detected, the optical pickup moves to another recording layer. Also, in the present embodiment, the defect area is determined by use of feedback light of the beam spot for recording, however the present invention is not limited thereto. After the completion of the recording operation on a predetermined sector or track, a laser beam at reading power may be emitted by the read-after-write operation, and a defect area may be detected by use of feedback light thereof. In this case, a tracking error or a focus error may be used. Otherwise, the error state of an actual reading signal may be used.

The optical recording apparatus according to the present invention is not limited to the foregoing embodiments and various modifications can be made as a matter of course without departing from the scope of the present invention.

According to the present invention, in a recording method and the like of various kinds of multilayer optical recording media, it is possible to restrain reduction in a recording rate.

The entire disclosure of Japanese Patent Application No. 2006-337693 filed on 15 Dec., 2006 including specification, claims, drawings, and summary are incorporated herein by reference in its entirety.

What is claimed is:

1. An optical recording method for recording information on a multilayer optical recording medium having a plurality of recording layers by irradiating the recording layer with a beam spot, wherein the information is recorded on a specific recording layer selected from the plurality of recording layer and a user data area of an escape recording layer selected from among the other recording layers except for the specific recording layer is irradiated with the beam spot each time a defect area is detected during recording on the specific recording layer in order to continue recording the information.

2. The optical recording method according to claim 1, wherein the multilayer optical recording medium has three or more recording layers and a recording layer which is two- or more-layers away from the specific recording layer is selected as the escape recording layer.

3. The optical recording method according to claim 1, wherein the multilayer optical recording medium has three or more recording layers and a recording layer which is even-numbered layers away from the specific recording layer is selected as the escape recording layer.

4. The optical recording method according to claim 1, wherein the multilayer optical recording medium has four or more recording layers.

5. The optical recording method according to claim 1, wherein the multilayer optical recording medium has four or more recording layers and a recording layer which is two- or more-layers away from the specific recording layer is selected as the escape recording layer.

6. The optical recording method according to claim 1, wherein the multilayer optical recording medium has four or more recording layers and a recording layer which is even-numbered layers away from the specific recording layer is selected as the escape recording layer.

7. The optical recording method according to claim 1, wherein after a predetermined amount of information is recorded on the user data area of escape recording layer, the beam spot returns to the specific recording layer to escape from the defect area and continue recording the information.

8. The optical recording method according to claim 1, wherein the user data area of the escape recording layer is approximately the same position as the defect area of the specific recording layer in a deposit direction.

9. An optical recording apparatus for a multilayer optical recording medium having a plurality of recording layers, the optical recording apparatus irradiating the multilayer optical recording medium with a beam spot in order to record information, the apparatus comprising:

a recording section for recording the information by irradiating a specific recording layer of any of the recording layers with the beam spot;

an inspection processing section for detecting a defect area with the use of reflected light of the beam spot of the recording section; and a focus shift processing section for shifting the focus of the beam spot to a user data area of a recording layer which is different from the specific recording layer each time the defect area is detected by an inspection process.

* * * * *